(12) United States Patent
Park et al.

(10) Patent No.: US 11,749,852 B2
(45) Date of Patent: Sep. 5, 2023

(54) BATTERY MODULE AND MANUFACTURING METHOD THEREOF

(71) Applicant: LG CHEM, LTD., Seoul (KR)

(72) Inventors: Jinwoo Park, Daejeon (KR); Tae Geun Kim, Daejeon (KR); Junyeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 200 days.

(21) Appl. No.: 16/964,474

(22) PCT Filed: Nov. 19, 2019

(86) PCT No.: PCT/KR2019/015877
§ 371 (c)(1),
(2) Date: Jul. 23, 2020

(87) PCT Pub. No.: WO2020/116825
PCT Pub. Date: Jun. 11, 2020

(65) Prior Publication Data
US 2021/0057689 A1 Feb. 25, 2021

(30) Foreign Application Priority Data

Dec. 5, 2018 (KR) .................. 10-2018-0155516

(51) Int. Cl.
*H01M 10/653* (2014.01)
*H01M 50/242* (2021.01)
*H01M 50/211* (2021.01)

(52) U.S. Cl.
CPC ....... *H01M 10/653* (2015.04); *H01M 50/211* (2021.01); *H01M 50/242* (2021.01)

(58) Field of Classification Search
CPC .. H01M 50/20; H01M 10/653; H01M 10/613; H01M 50/211; H01M 10/647;
(Continued)

(56) References Cited

U.S. PATENT DOCUMENTS

| 10,062,930 B2 | 8/2018 | Bober |
| 2011/0090614 A1 | 4/2011 | Guerin et al. |

(Continued)

FOREIGN PATENT DOCUMENTS

| CN | 101926022 A | 12/2010 |
| CN | 102246340 A | 11/2011 |

(Continued)

OTHER PUBLICATIONS

Extended European Search Report for European Application No. 19893408.5, dated Sep. 14, 2021.

(Continued)

*Primary Examiner* — Kaity V Chandler
(74) *Attorney, Agent, or Firm* — Birch, Stewart, Kolasch & Birch, LLP

(57) ABSTRACT

A battery module including a battery cell stacked body in which a plurality of battery cells are adjacent each other in parallel and are stacked; a mono frame receiving the battery cell stacked body and including at least one opening opened in a length direction of the battery cell stacked body, and including an upper plate and a lower plate that are perpendicular to a stacked side of the battery cell stacked body and a pair of lateral plates in parallel to the stacked side of the battery cell stacked body; an external expansion controlling pad provided between the battery cell stacked body and the mono frame; and a heat radiating resin provided between the battery cell stacked body and the lower plate. The external expansion controlling pad includes two main bodies and two bridges connecting the two main bodies.

12 Claims, 6 Drawing Sheets

(58) Field of Classification Search
CPC .. H01M 50/244; H01M 50/289; H01M 50/24; Y02E 60/10
See application file for complete search history.

(56) References Cited

U.S. PATENT DOCUMENTS

| | | |
|---|---|---|
| 2011/0244299 A1 | 10/2011 | Guener et al. |
| 2013/0071718 A1 | 3/2013 | Cho et al. |
| 2016/0197386 A1 | 7/2016 | Moon et al. |
| 2017/0301905 A1 | 10/2017 | Takeda et al. |
| 2018/0076493 A1 | 3/2018 | Park et al. |
| 2018/0358592 A1 | 12/2018 | Park et al. |
| 2018/0366794 A1 | 12/2018 | Kim et al. |
| 2019/0067656 A1* | 2/2019 | Zhang .................. H01M 50/24 |
| 2019/0067762 A1* | 2/2019 | Zhang ................ H01M 50/244 |
| 2019/0109353 A1 | 4/2019 | Hwang |
| 2020/0152932 A1 | 5/2020 | Ozawa et al. |
| 2020/0194853 A1 | 6/2020 | Yoo et al. |
| 2020/0350644 A1 | 11/2020 | Cho et al. |

FOREIGN PATENT DOCUMENTS

| | | | |
|---|---|---|---|
| CN | 105493309 A | 4/2016 | |
| CN | 103222022 B * | 9/2016 | ............. H01G 11/74 |
| CN | 205828488 U * | 12/2016 | .......... H01M 10/659 |
| CN | 106663760 A * | 5/2017 | .......... H01M 10/613 |
| CN | 106716675 A | 5/2017 | |
| CN | 107305966 A * | 10/2017 | ............ H01M 10/14 |
| CN | 107431147 A * | 12/2017 | .............. B60L 50/64 |
| CN | 108370075 A * | 8/2018 | .......... H01M 10/613 |
| CN | 108475832 A | 8/2018 | |
| CN | 207818695 U * | 9/2018 | ............. Y02E 60/10 |
| CN | 109873104 A * | 6/2019 | .......... H01M 10/653 |
| CN | 109904561 A * | 6/2019 | ............. Y02E 60/10 |
| CN | 208939023 U * | 6/2019 | .......... H01M 10/425 |
| CN | 209249516 U * | 8/2019 | .......... H01M 10/653 |
| CN | 209312824 U * | 8/2019 | ............. Y02E 60/10 |
| CN | 106941142 B * | 9/2019 | .......... B60L 11/1879 |
| CN | 110299506 A * | 10/2019 | ............. B60L 50/64 |
| CN | 110329414 A * | 10/2019 | ............. Y02E 60/10 |
| CN | 209472014 U * | 10/2019 | ............. Y02E 60/10 |
| JP | 2000-108687 A | 4/2000 | |
| JP | 5028346 B2 | 9/2012 | |
| JP | 2012-204038 A | 10/2012 | |
| JP | 2017-62918 A | 3/2017 | |
| JP | 2020-47507 A | 3/2020 | |
| KR | 10-2010-0100943 A | 9/2010 | |
| KR | 10-2013-0031147 A | 3/2013 | |
| KR | 101255250 B1 * | 4/2013 | ............ H01M 10/42 |
| KR | 10-2015-0025236 A | 3/2015 | |
| KR | 10-2016-0105354 A | 9/2016 | |
| KR | 10-2017-0113466 A | 10/2017 | |
| KR | 10-2017-0113904 A | 10/2017 | |
| KR | 10-2017-0134545 A | 12/2017 | |
| KR | 10-2017-0135476 A | 12/2017 | |
| KR | 20180025643 A * | 3/2018 | ............ H01M 50/24 |
| KR | 10-2018-0071800 A | 6/2018 | |
| KR | 20190106060 A * | 9/2019 | ............ H01M 50/20 |
| WO | WO 2010/066637 A1 | 6/2010 | |
| WO | WO 2011/061931 A1 | 5/2011 | |
| WO | WO 2016/059751 A1 | 4/2016 | |
| WO | WO 2017/047211 A1 | 3/2017 | |
| WO | WO 2018/008866 A1 | 1/2018 | |
| WO | WO-2018008866 A1 * | 1/2018 | ......... H01M 10/613 |
| WO | WO 2018/173860 A1 | 9/2018 | |
| WO | WO-2018173860 A1 * | 9/2018 | ............. B08B 15/04 |
| WO | WO 2019/083177 A1 | 5/2019 | |
| WO | WO 2020/022844 A1 | 1/2020 | |

OTHER PUBLICATIONS

International Search Report issued in PCT/KR2019/015877 (PCT/ISA/210), dated Mar. 2, 2020.

* cited by examiner

BATTERY MODULE AND MANUFACTURING METHOD THEREOF

CROSS-REFERENCE TO RELATED APPLICATION

This application claims priority to and the benefit of Korean Patent Application No. 10-2018-0155516 filed in the Korean Intellectual Property Office on Dec. 5, 2018, the entire contents of which are incorporated herein by reference.

BACKGROUND OF THE INVENTION

(a) Field of the Invention

The present invention relates to a battery module and a manufacturing method thereof, and it particularly relates to a battery module for stably realizing a configuration for improving module cooling performance and a manufacturing method thereof.

(b) Description of the Related Art

As technical developments and demands on mobile devices increase, demands on rechargeable batteries as energy sources are steeply increasing. Accordingly, studies on the rechargeable batteries for satisfying various demands are in active progress.

The rechargeable batteries are gaining much attention as energy sources for power-based devices such as electric bicycles, electric vehicles, and hybrid electric vehicles in addition to mobile devices such as mobile phones, digital cameras, and laptops.

Small battery packs to which a single battery cell is packed are used in small devices such as cellular phones and cameras, and mid-sized or large battery packs to which a battery module or a battery pack having two or more battery cells connected in parallel and/or in series are packed are used in mid-sized/large devices such as laptops and electric vehicles. Therefore, the number of battery cells included in the battery pack may be set in various ways according to a required output voltage or charging and discharging capacity.

In addition, when a battery pack is configured by connecting a plurality of battery cells in series/parallel, a battery module formed with at least one battery cell is configured in advance, and other constituent elements are added thereto by using at least one battery module to configure a battery pack, which is a general method.

Regarding the battery module, importance of the method for efficiently cooling heat generated by the battery cell according to the increase of required battery capacity is gradually increasing. For this purpose, a configuration for improving thermal conductivity by applying a heat radiating resin into a case of the battery module has been introduced.

However, when the heat radiating resin is injected into the case through an injection hole in the battery module, the heat radiating resin may not be stably applied in a designated area but may be applied at a lesser amount or may be excessively applied therein, thereby exercising a negative influence to cooling performance or increasing an expense.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a battery module for providing excellent liquid-injection quality and cooling performance by stably applying a heat radiating resin, reducing a cost of a manufacturing process, and improving efficiency, and a manufacturing method thereof.

However, tasks to be solved by exemplary embodiments of the present invention may not be limited to the above-described tasks, and may be extended in various ways within a range of technical scopes included in the present invention.

An exemplary embodiment of the present invention provides a battery module including: a battery cell stacked body including a plurality of battery cells stacked adjacent each other in parallel; a mono frame configured to receive the battery cell stacked body, the mono frame including at least one opening opened in a length direction of the battery cell stacked body, an upper plate and a lower plate that are perpendicular to a stacked side of the battery cell stacked body, and a pair of lateral plates in parallel to the stacked side of the battery cell stacked body; an external expansion controlling pad provided between the battery cell stacked body and the mono frame; and a heat radiating resin provided between the battery cell stacked body and the lower plate, wherein the external expansion controlling pad includes two main bodies covering opposite sides of the battery cell stacked body and provided between the battery cell stacked body and the pair of lateral plates, and two bridges connecting the two main bodies and provided along a side of the battery cell stacked body between the battery cell stacked body and the lower plate.

The heat radiating resin may be provided in a space formed by the two main bodies and the two bridges.

The lower plate may include a plurality of injection holes for injecting the heat radiating resin.

The heat radiating resin may be a thermal resin.

The battery module may further include a plurality of internal expansion controlling pads provided between adjacent battery cells of the plurality of battery cells.

The external expansion controlling pad and the plurality of internal expansion controlling pad may include a polyurethane or an ethylene propylene diene monomer (EDPM).

Another embodiment of the present invention provides a method for manufacturing a battery module, including: manufacturing a battery cell stacked body including a plurality of battery cells stacked adjacent to each other in parallel; forming an external expansion controlling pad including two main bodies for covering a pair of battery cells of the plurality of battery cells provided at outermost sides of the battery cell stacked body and two bridges connecting the two main bodies and provided along a side of the battery cell stacked body; inserting the battery cell stacked body on which the external expansion controlling pad is formed in a mono frame; and injecting a heat radiating resin into a space formed by the two main bodies and the two bridges between the mono frame and the battery cell stacked body.

When the heat radiating resin is injected, the two main bodies and the two bridges may function as a dam for preventing the heat radiating resin from running down to an outside of the battery cell stacked body.

The mono frame may include at least one opening opened in a length direction of the battery cell stacked body, an upper plate and a lower plate that are perpendicular to a stacked side of the battery cell stacked body and a pair of lateral plates in parallel to the stacked side of the battery cell stacked body, and the heat radiating resin may be injected between the lower plate of the mono frame and the battery cell stacked body.

Injecting the heat radiating resin may be performed while the battery module is disposed so that the lower plate may face upwards with respect to a gravity direction.

The lower plate may include a plurality of injection holes for injecting the resin.

According to the exemplary embodiments, regarding the battery module into which the heat radiating resin is injected, the battery module for providing excellent liquid-injection quality and cooling performance by stably applying a heat radiating resin, reducing a cost of a manufacturing process without providing an additional process, and improving efficiency, and the manufacturing method thereof, may be provided.

DETAILED DESCRIPTION OF THE EMBODIMENTS

Figure 1A:
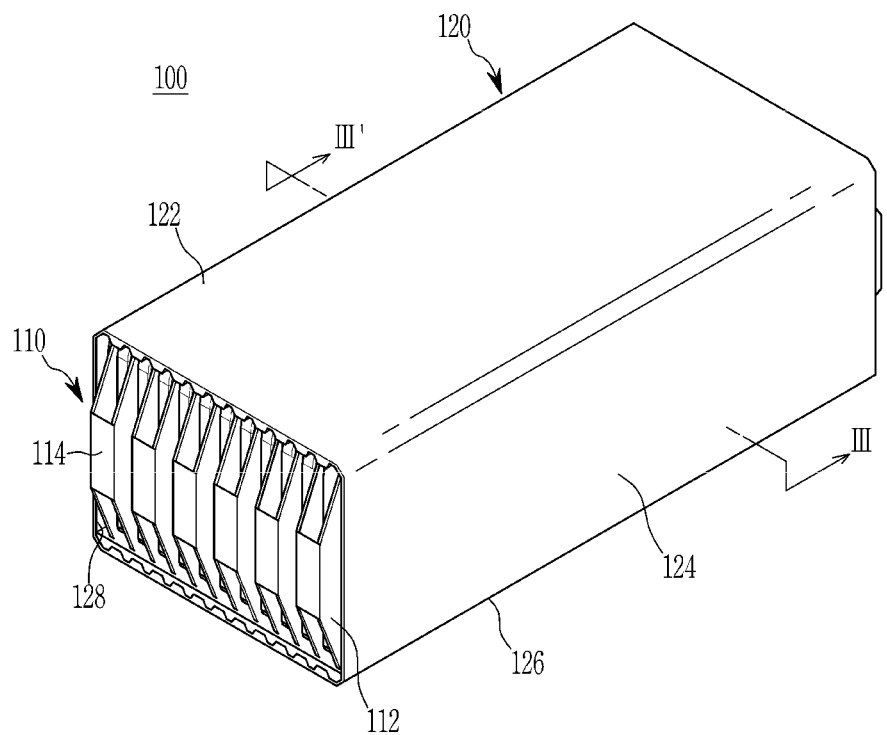
FIG. 1A shows a perspective view of a battery module according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Further, the size and thickness of each configuration shown in the drawings are arbitrarily shown for better understanding and ease of description, and the present invention is not limited thereto. In the drawings, the thickness of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

Unless explicitly described to the contrary, the word "comprise" and variations such as "comprises" or "comprising" will be understood to imply the inclusion of stated elements but not the exclusion of any other elements.

The phrase "on a plane" means viewing the object portion from the top, and the phrase "on a cross-section" means viewing a cross-section of which the object portion is vertically cut from the side.

Figure 1B:
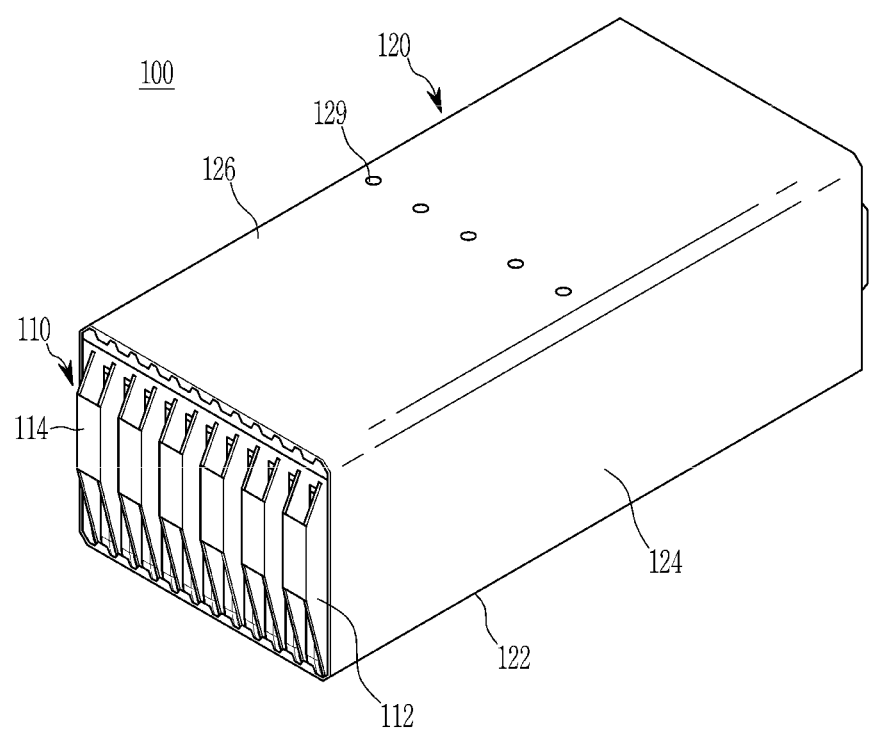
FIG. 1B shows a perspective view of a battery module shown in FIG. 1A that is rotated by 180 degrees.

FIG. 1A shows a perspective view of a battery module according to an exemplary embodiment of the present invention, and FIG. 1B shows a perspective view of a battery module shown in FIG. 1A that is rotated by 180 degrees.

Referring to FIG. 1A and FIG. 1B, the battery module 100 according to an exemplary embodiment of the present invention includes a battery cell stacked body 110 in which battery cells 112 are attacked, and a mono frame 120 into which the battery cell stacked body 110 is received.

The battery cell stacked body 110 is an assembly of a rechargeable battery including a plurality of battery cells 112. The battery cell stacked body 110 may include a plurality of battery cells 112, and each battery cell includes an electrode lead 114. The battery cell 112 may be a pouch-type battery cell having a planar shape, but is not limited thereto. The electrode lead 114 is a positive lead or a negative lead, the electrode lead 114 of the battery cell 112 includes an end that may be bent in one direction, and it may accordingly contact an end of an electrode lead of another adjacent battery cell 112. The two electrode leads 114 contacting each other may be fixed by welding the same with each other, and by this, the battery cells 112 inside the battery cell stacked body 110 may be electrically connected to each other.

A plurality of battery cells 112 are perpendicularly stacked so that the electrode leads 114 may be arranged in one direction, thereby forming the battery cell stacked body 110

The battery cell stacked body 110 includes at least one opening 128 opened in a length direction of the battery cell stacked body 110, and is received into the mono frame 120 including an upper plate 122 and a lower plate 126 that are perpendicular to a stacked side of the battery cell stacked body 110, and a pair of lateral plates 124 in parallel to the stacked side of the battery cell stacked body 110. In this instance, the electrode leads 114 may be exposed through the opening 128, and the opening 128 may be covered by an end plate (not shown) including a configuration for electrically connecting the electrode lead 114 to the outside.

A plurality of injection holes 129 for injecting a heat radiating resin 200 to be described are formed in the lower plate 126 of the mono frame 120. That is, while the battery cell stacked body 110 is received in the mono frame 120, as shown in FIG. 1B, the battery module 100 is disposed so that the lower plate 126 may be provided to a top thereof, and the heat radiating resin 200 is injected through the injection hole 129 in the lower plate 126. A detailed description thereof will be described in a later portion of the present specification.

The heat radiating resin 200 and expansion controlling pads 300 and 400 provided in the mono frame 120 will now be described with reference to FIG. 2 to FIG. 4 together with FIG. 1A and FIG. 1B.

Figure 2:
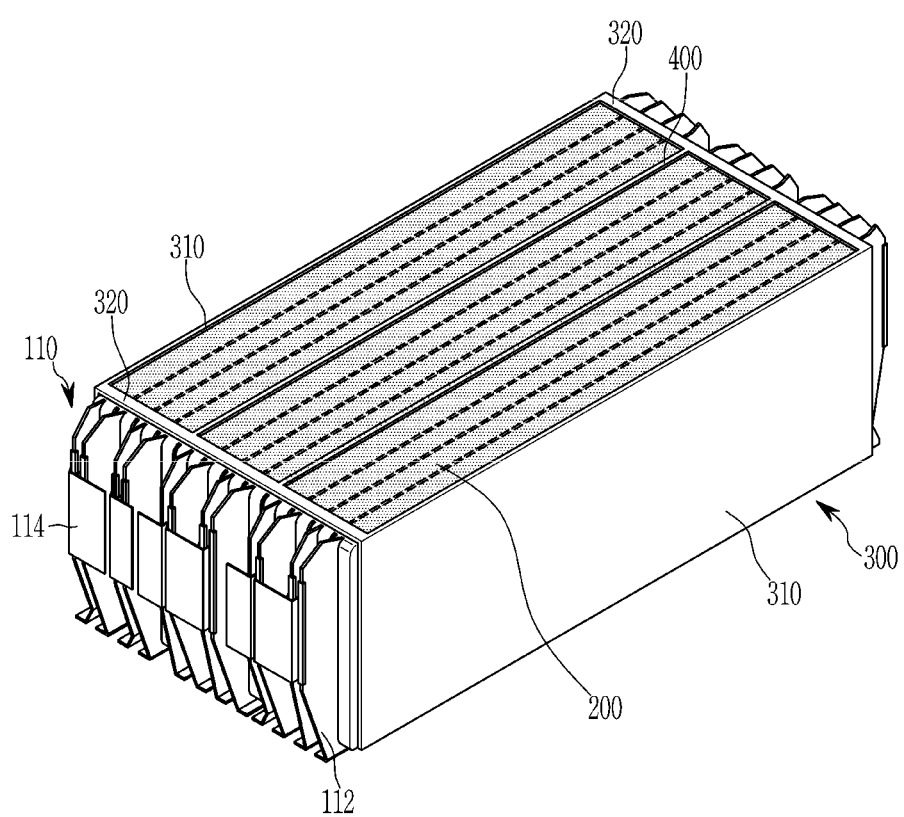
FIG. 2 shows a perspective view of a state in which a mono frame is removed from FIG. 1B.
Figure 3:
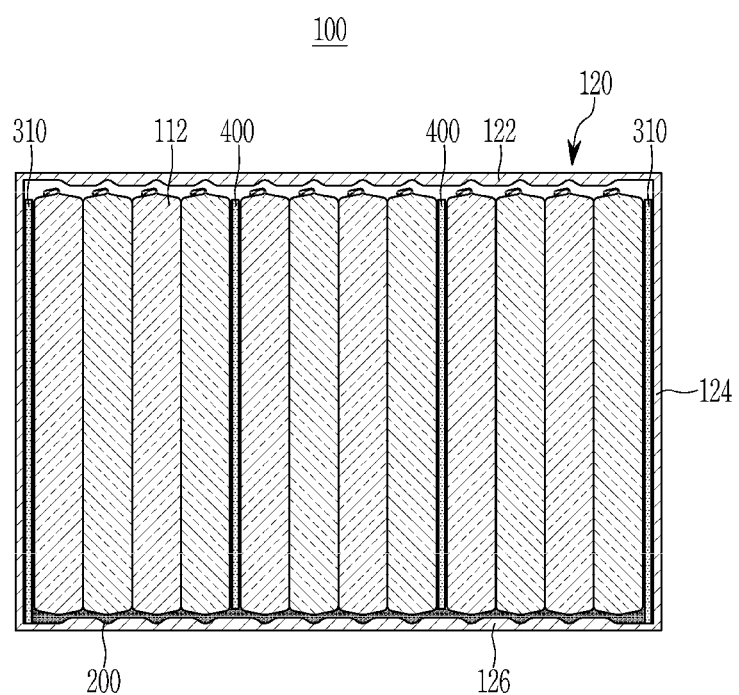
FIG. 3 shows a cross-sectional view with respect to a line III-III' of FIG. 1A.
Figure 4:
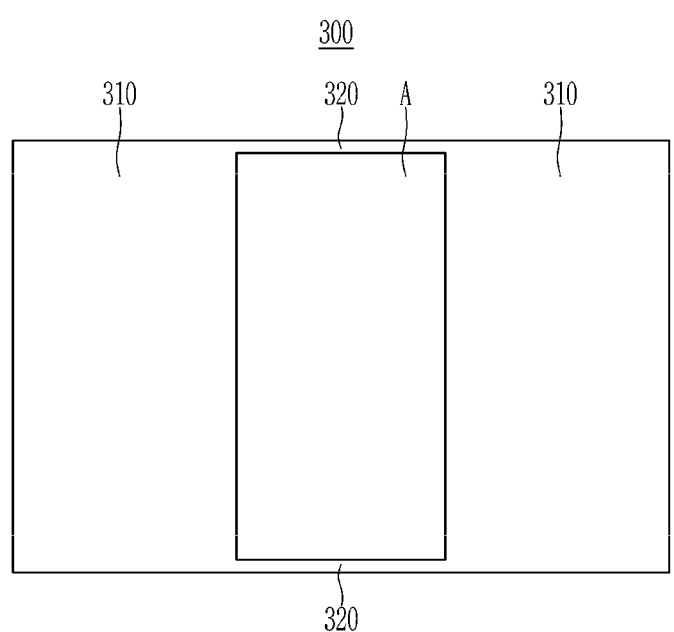
FIG. 4 shows a developed diagram of an external expansion controlling pad according to an exemplary embodiment of the present invention.

FIG. 2 shows a perspective view on a state that a mono frame is removed from FIG. 1B, FIG. 3 shows a cross-sectional view with respect to a line III-III' of FIG. 1A, and FIG. 4 shows a developed diagram of an external expansion controlling pad according to an exemplary embodiment of the present invention.

The heat radiating resin 200 is provided between the battery cell stacked body 110 and the lower plate 126. The heat radiating resin 200 is made of a heat conducting material so that the heat generated by the battery cell stacked body 110 may be discharged to the outside, and for example, it may be made of a thermal resin. Examples of the thermal resin include silicon, urethane, and epoxy.

The heat radiating resin 200 is injected through the injection hole 129 formed in the lower plate 126. In this case of injection, when the injection amount of the resin is appropriately adjusted, the same may be sufficiently injected to a desired portion, that is, between the battery cell stacked body 110 and the lower plate 126. When the injection amount is too small, the heat radiating resin 200 is not uniformly formed over the whole lower plate 126, so the heat is insufficiently discharged. When the injection amount is too large, the heat radiating resin 200 flows to an unneeded portion, so drawbacks that the manufacturing cost caused by the loss of resources may increase and the quality at the portion where the heat radiating resin 200 overflows may be deteriorated are generated. Therefore, there is a need to form the heat radiating resin 200 at the desired space by appropriately controlling the injection amount of the heat radiating resin 200.

For this purpose, in the present exemplary embodiment, as shown in FIG. 2 and FIG. 3, the injection space of the heat radiating resin 200 is obtained by using the external expansion controlling pad 300. The external expansion controlling pad 300 is provided between the battery cell stacked body 110 and the mono frame 120, and in detail, it includes two main bodies 310 covering one side of the battery cell stacked body 110, and provided between the battery cell stacked body 110 and a pair of lateral plates 124, and two bridges 320 connecting the two main bodies 310, and formed along a side of the battery cell stacked body 110 between the battery cell stacked body 110 and the lower plate 126.

The heat radiating resin 200 is provided in a space formed on the two main bodies 310 and the two bridges 320. As shown in FIG. 2, when the two main bodies 310 are provided to contact respective sides of the battery cell stacked body 110, a portion protruding to be higher than the battery cell stacked body 110 configures a long side of the space in which the heat radiating resin 200 is provided, and the two bridges 320 provided between the battery cell stacked body 110 and the lower plate 126 configure a short side of the space in which the heat radiating resin 200 is provided. By this, a space partitioned by the two main bodies 310 and the two bridges 320 is formed between the lower plate 126 and the battery cell stacked body 110, and the heat radiating resin 200 is injected through the injection hole 129 of the lower plate 126 to fill the corresponding space.

In this instance, the above-described two main bodies 310 and two bridges 320 function as a dam for preventing the heat radiating resin 200 from overflowing. That is, when the heat radiating resin 200 is excessively injected, the heat radiating resin 200 may flow down along a corner of the battery cell stacked body 110, and according to the present exemplary embodiment, the effect of injecting the heat radiating resin 200 into a desired portion without it flowing down may be obtained by the two main bodies 310 and the two bridges 320 functioning as a dam.

Particularly, according to the present exemplary embodiment, for the above-noted dam function, the above-noted effect may be simply achieved by differently cutting the pad installed for an expansion control without providing additional parts or adding a design. That is, as shown in FIG. 4, the two main bodies 310 corresponding to the stacked side of the battery cell stacked body 110 and the two bridges 320 connecting the two main bodies 310 and formed along the side of the battery cell stacked body 110 are connected to each other and are integrally formed, so the space (A) into which the heat radiating resin 200 is injected may be obtained by cutting the expansion controlling pad in this shape and applying the same to the battery cell stacked body 110.

Further, as the two main bodies 310 and the two bridges 320 function as a dam, the heat radiating resin 200 may be injected up to a predetermined injection amount without overflowing without performing a precise control to the heat radiating resin 200, so there is no need to install a large number of injection holes for the purpose of controlling the injection amount, and the injection facilities may be simplified.

The height that is a protrusion of the two main bodies 310 from the battery cell stacked body 110 and the thickness of the two bridges 320 may be appropriately selected by considering a type and viscosity of the heat radiating resin 200, and they are not specifically limited thereto.

The expansion controlling pad may further include, in the battery cell stacked body 110, a plurality of internal expansion controlling pads 400 provided between the battery cells 112. The internal expansion controlling pads 400 may have substantially the same area as the stacked side of the battery cell stacked body 110, and may be inserted each time three to four battery cells 112 are stacked, but are not limited thereto, and the number and the thickness may be appropriately adjusted as needed.

The internal expansion controlling pad 400 and the external expansion controlling pad 300 may control cell swelling as they are compressed and perform a buffering function when the battery cells 112 expand, thereby preventing the battery cells 112 and the mono frame 120 from being damaged by the expansion of the battery cells 112. For this purpose, the internal expansion controlling pad 400 and the external expansion controlling pad 300 may include a material including a soft elastic substance such as polyurethane (PU) or ethylene propylene diene monomer (EDPM). The above-noted material has excellent absorption of vibration and a repulsive force on compression, so when a cell swelling phenomenon is generated to a plurality of battery cells 112, a guide function may be performed so that the battery module 100 with excellent dimensional stability may be provided.

As described above, as the external expansion controlling pad 300 including two main bodies 310 and two bridges 320 functions as a dam so that the heat radiating resin 200 injected between the battery cell stacked body 110 and the lower plate 126 of the mono frame 120 may not flow, so the battery module 100 for providing excellent liquid-injection quality and cooling performance by stably applying the heat radiating resin 200 without a special additional process, reducing the expense of the manufacturing process, and improving efficiency may be provided.

A method for manufacturing a battery module according to an exemplary embodiment of the present invention will now be described with reference to FIG. 5.

Figure 5:
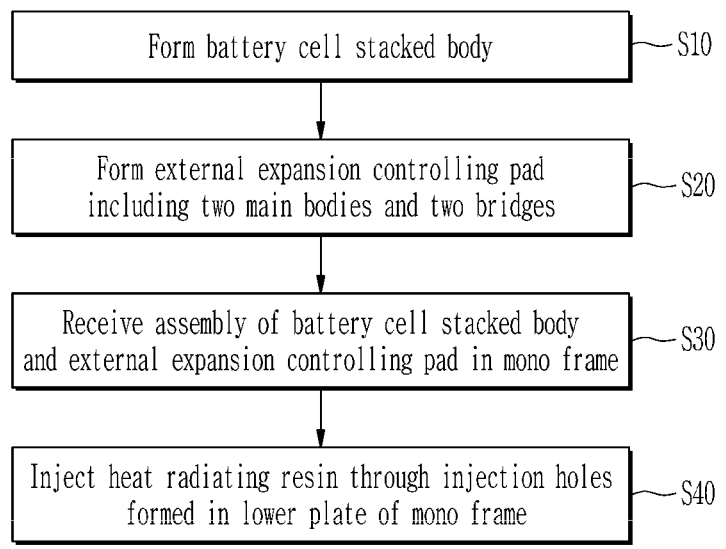
FIG. 5 shows a flowchart of a method for manufacturing a battery module according to an exemplary embodiment of the present invention.

FIG. 5 shows a flowchart of a method for manufacturing a battery module according to an exemplary embodiment of the present invention.

A plurality of battery cells 112 are stacked, and they are connected with an electrode lead 114 to form a battery cell stacked body 110 (S10).

In this instance, a plurality of internal expansion controlling pads 400 may be stacked together between a plurality of battery cells 112 to form the same.

An external expansion controlling pad 300 including two main bodies 310 for covering the battery cell provided on the outermost side of the battery cell stacked body 110 and two bridges 320 connecting the two main bodies 310 and formed along a side of the battery cell stacked body 110 is formed (S20).

That is, the external expansion controlling pad 300 is formed by cutting the expansion controlling pad as shown in FIG. 4 in the form in which two main bodies 310 corresponding to the stacked side of the battery cell stacked body 110 and two bridges 320 connecting the same are connected to each other and are integrally formed. The two main bodies 310 of the external expansion controlling pad 300 are disposed to respectively cover the battery cell provided on the outermost side of the battery cell stacked body 110, and hence, the two bridges 320 provided between the two main bodies 310 are disposed along the sides of the battery cell stacked body 110.

An assembly of the battery cell stacked body 110 and the external expansion controlling pad 300 is received in the mono frame 120 (S30).

In this instance, the two bridges 320 are provided on the lower plate 126 of the mono frame 120, and the two main bodies 310 are disposed to respectively face the lateral plate 124 of the mono frame 120. The electrode lead 114 of the battery cell stacked body 110 is exposed through an opening 128 of the mono frame 120, and in this instance, the opening 128 may be covered with an end plate (not shown) including a configuration for electrically connecting the electrode lead 114 to the outside.

The mono frame 120 is rotated by 180 degrees so that the lower plate 126 may face upwards with respect to a gravity direction, and the heat radiating resin 200 is injected through a plurality of injection holes 129 formed in the lower plate 126 (S40).

In this instance, the above-described two main bodies 310 and two bridges 320 function as a dam for preventing the heat radiating resin 200 from overflowing. That is, when the heat radiating resin 200 is excessively injected, the heat radiating resin 200 may run down along a corner of the battery cell stacked body 110, but according to the present exemplary embodiment, the effect that the heat radiating resin 200 is injected into the desired portion without running down by the two main bodies 310 and the two bridges 320 functioning as a dam is provided.

A viscosity of the injected heat radiating resin 200 may be 200,000 cP to 300,000 cP. However, when the configuration according to the present invention is applied, it includes the two main bodies 310 and the two bridges 320 functioning as a dam, so the heat radiating resin 200 may be applied to the desired area irrespective of resin characteristics such as dynamic flowability, viscosity, or a resin type, and running down to an undesired area may be prevented, and the viscosity of the heat radiating resin 200 may be applied without specific limits.

When injection of the heat radiating resin 200 injected as a liquid is finished, it may be completed by natural hardening.

As described above, the method for manufacturing the battery module 100 for providing excellent liquid-injection quality and cooling performance by stably applying the heat radiating resin 200 without a special additional process, reducing the expense of the manufacturing process, and improving efficiency may be provided as the external expansion controlling pad 300 including two main bodies 310 and two bridges 320 injects the heat radiating resin 200 while functioning as a dam for preventing the heat radiating resin 200 injected between the battery cell stacked body 110 and the lower plate 126 of the mono frame 120 from flowing.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: battery module
110: battery cell stacked body
120: mono frame
200: heat radiating resin
300: external expansion controlling pad

What is claimed is:

1. A battery module comprising:
a battery cell stacked body including a plurality of battery cells stacked adjacent each other in parallel;
a mono frame configured to receive the battery cell stacked body, the mono frame including at least one opening opened in a length direction of the battery cell stacked body, an upper plate and a lower plate that are perpendicular to a stacked side of the battery cell stacked body, and a pair of lateral plates in parallel to the stacked side of the battery cell stacked body;
an external expansion controlling pad provided between the battery cell stacked body and the mono frame; and
a heat radiating resin provided between the battery cell stacked body and the lower plate,
wherein the external expansion controlling pad is integrally formed and includes two main bodies covering opposite sides of the battery cell stacked body and provided between the battery cell stacked body and the pair of lateral plates, and two bridges connecting the two main bodies and provided along a side of the battery cell stacked body between the battery cell stacked body and the lower plate,
wherein the heat radiating resin is provided in a space formed by the two main bodies and the two bridges, and
wherein the two main bodies and the two bridges of the external expansion controlling pad are integrally connected to each other.

2. The battery module of claim 1, wherein
the lower plate includes a plurality of injection holes for injecting the heat radiating resin.

3. The battery module of claim 1, wherein
the heat radiating resin is a thermal resin.

4. The battery module of claim 1, further comprising a plurality of internal expansion controlling pads provided between adjacent battery cells of the plurality of battery cells.

5. The battery module of claim 4, wherein
the external expansion controlling pad and the plurality of internal expansion controlling pads include a polyurethane or an ethylene propylene diene monomer (EDPM).

6. The battery module of claim 1, wherein each battery cell has an electrode lead extending from a first end thereof, and wherein the electrode leads extend beyond the opening of the mono frame.

7. The battery module of claim 1, wherein the at least one opening includes a pair of openings at opposite ends of the mono frame.

8. A method for manufacturing a battery module, comprising:
   manufacturing a battery cell stacked body including a plurality of battery cells stacked adjacent to each other in parallel;
   integrally forming an external expansion controlling pad including two main bodies for covering a pair of battery cells of the plurality of battery cells provided at outermost sides of the battery cell stacked body and two bridges connecting the two main bodies and provided along a side of the battery cell stacked body;
   inserting the battery cell stacked body on which the external expansion controlling pad is formed into a mono frame in a first direction; and
   injecting a heat radiating resin into a space formed by the two main bodies and the two bridges between the mono frame and the battery cell stacked body in a second direction perpendicular to the first direction,
   wherein the two main bodies and the two bridges of the external expansion controlling pad are integrally connected to each other such that the external expansion controlling pad is integrally formed.

9. The method of claim 8, wherein
   when the heat radiating resin is injected, the two main bodies and the two bridges function as a dam for preventing the heat radiating resin from running down to an outside of the battery cell stacked body.

10. The method of claim 8, wherein
    the mono frame includes at least one opening opened in a length direction of the battery cell stacked body, an upper plate and a lower plate that are perpendicular to a stacked side of the battery cell stacked body, and a pair of lateral plates in parallel to the stacked side of the battery cell stacked body, and
    the heat radiating resin is injected between the lower plate of the mono frame and the battery cell stacked body.

11. The method of claim 10, wherein
    the injecting the heat radiating resin is performed while the battery module is disposed so that the lower plate faces upwards with respect to a gravity direction.

12. The method of claim 10, wherein
    the lower plate includes a plurality of injection holes for injecting the resin.

\* \* \* \* \*